April 16, 1940.         A. R. CURTIS ET AL         2,197,206
                          FISH HOLDING DEVICE
                          Filed April 14, 1938
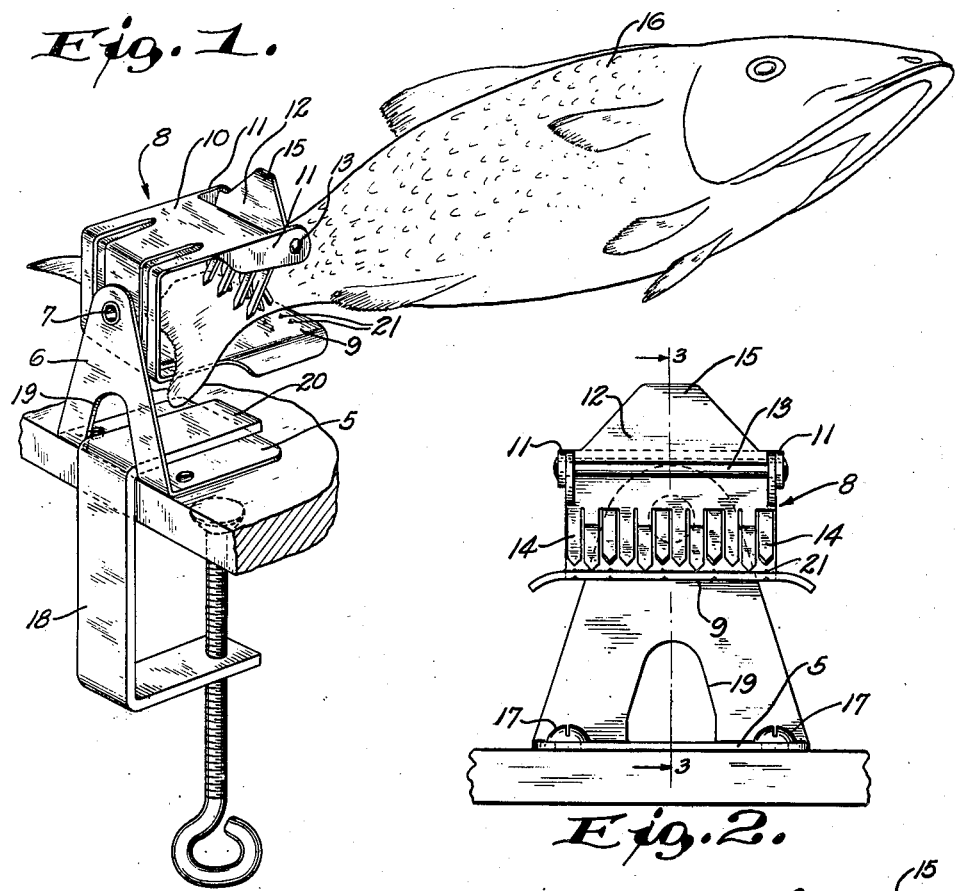
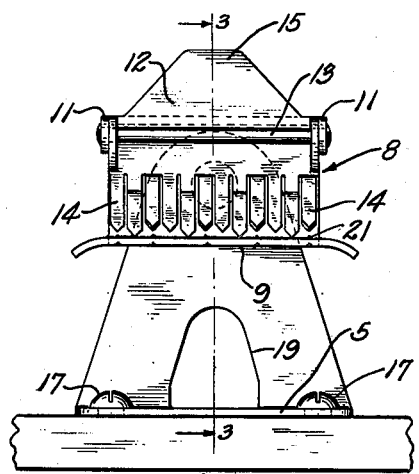
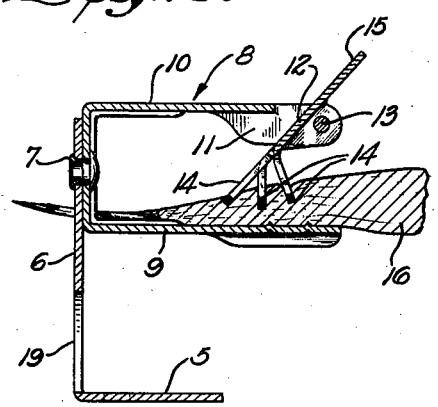
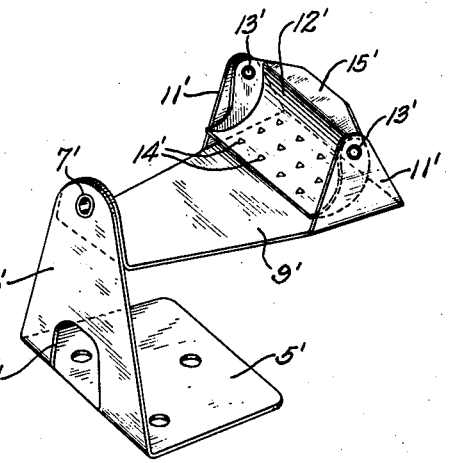
INVENTORS
Albert P Curtis
BY John Steckauner
   Morrell Liebman Morrell
                    ATTORNEYS.

Patented Apr. 16, 1940

2,197,206

UNITED STATES PATENT OFFICE 2,197,206

FISH HOLDING DEVICE

Albert R. Curtis and John Stechauner, Milwaukee, Wis.

Application April 14, 1938, Serial No. 201,904

2 Claims. (Cl. 17—8)

This invention relates to improvements in fish holding devices.

In preparing fish for use as food scaling is not only unpleasant but is also troublesome because of the difficulty of holding the slippery fish while scraping off the scales. Heretofore, a few devices have been proposed for facilitating this procedure, but these devices are all of a complicated nature, are expensive to manufacture, and are troublesome to mount and manipulate.

It is a general object of the present invention to provide a fish holder formed of a few simple stampings, which can be quickly and firmly mounted in operative position on a support and which will instantaneously and practically automatically grip an end of a fish as soon as the latter is inserted.

A further object of the invention is to provide a fish holder as above described which is engageable with one end of the fish, such as the tail portion, whereby the operator may grasp the head end of the fish with one hand, leaving his other hand free to manipulate a scaling knife, the construction being such that the harder the head end of the fish is pulled the tighter the grip of the device on the tail portion. Thus the fish may be stretched out and held in taut position to greatly facilitate the scaling operation.

A further object of the invention is to provide a device of the class described which permits rotation of the fish without interrupting the scaling operation.

A more specific object of the invention is to provide a fish holder having a support and having a fish engaging member mounted on said support, said member being specially constructed so that it is open at both the front and sides to readily receive and firmly hold fish of varied size or width.

A further object of the invention is to provide a fish holder having a supporting portion which is constructed for firm attachment to a table either permanently by the use of screws, or removably by the use of a standard clamp, the supporting portion of the device being specially constructed for cooperation with said clamp.

Other objects of the invention are to provide a fish holder which is neat in appearance, inexpensive, strong and durable, and well adapted for the purpose described.

With the above and other objects in view, the invention consists of the improved fish holding device and all its parts and combinations as set forth in the claims and all equivalents thereof.

In the accompanying drawing illustrating preferred embodiments of the invention in which the same reference numerals designate the same parts in all of the views:

Fig. 1 is a perspective view of the preferred form of the device showing it attached to a fragment of a table and showing a fish in operative position;

Fig. 2 is a front elevational view of the device showing it permanently attached by screws to a table;

Fig. 3 is a vertical sectional view taken on line 3—3 of Fig. 2 showing a portion of a fish in operative position; and Fig. 4 is a perspective view of a modification.

Referring more particularly to the drawing, the numeral 5 designates a base having an upright extension 6, the said extension being preferably an integral part of the base and bent upwardly from an edge thereof.

Secured by a rivet 7 or other swivel providing means to the upright 6 is a fish supporting member designated generally by the numeral 8, said member being substantially U-shaped and including spaced plates 9 and 10 which project forwardly. The plate 9 may form a supporting shelf for the tail end of a fish as shown in Fig. 1 and is preferably provided on its upper surface with a plurality of projections 21 or with a roughened surface. The plate 9 has spaced projecting ears 11 at its outer end and has a flap 12 forming a fish holding member pivotally mounted on a pivot rod 13, which member extends between the ears 11. The portion of the flap 12 below the pivot has its lower edge formed with any desired fish engaging means. It is preferred, however, to form pointed teeth 14 which are bent at different angles with respect to each other in the manner shown in Fig. 3. Above the pivot 13 the flap member 12 is formed with a portion 15 which may be manipulated to release the holding member from the fish, or the fish may be released by a rearward push on the fish.

In use a fish 16 may have its tail portion inserted either in the front of the device between the plates 9 and 10 or it may be inserted in position from either of the open sides. The fish holding member 12 is freely pivoted and will automatically swing to fish engaging position to contact the meaty portion of the fish at the tail thereof. It is to be noted that the point of engagement of the teeth 14 with the fish is rearwardly of the pivotal mounting 13 (see Fig. 3). Thus a forward pull on the fish will automatically cause the teeth to dig into the fish, and the harder the pull the tighter the engagement of the device with the fish.

The operator will hold the head end of the fish with one hand and manipulate the scaling knife with the other hand. Due to the swivel mounting at 7 the fish supporting member 8 may be rotated while the scaling is being performed and without interrupting the scaling operation. The device may be permanently attached to a table by screws 17 in the manner shown in Fig. 2 or it may be removably attached by the use of a standard clamp 18 in the manner shown in Fig. 1. In order to permit the use of a standard form of clamp for firm attachment of the device to a table, the upright extension 6 is formed with an aperture 19 through which the upper arm 20 of the clamp extends to thereby firmly hold the base 5 in position.

In Fig. 4 a modified form of the invention is illustrated which form includes a base 5' having an upright extension 6' and having a fish supporting shelf 9' connected by a swivel 7' with the upright extension 6'.

The supporting shelf 9' has its forward end provided with upwardly extending spaced ears 11' between which the fish holding member 12' is pivoted as at 13'. The fish holding member is curved in cross section and its lower portion has metal stamped downwardly therefrom as at 14' to provide downwardly extending projections engageable with the end of a fish. The member 12' has a release extension 15'.

The form of the invention shown in Figure 4 is utilized in the same manner as the principal form of the invention, the tail end of the fish being inserted between the ears 11' and underneath the fish holding member 12'.

It is apparent that both forms of the invention serve to hold the tail end of the fish in a practically automatic manner as soon as the fish is inserted, because the holding member will swing by gravity to engaging position and will dig into the fish automatically as soon as the fish is pulled taut to suitable position for scaling, and the harder the pull on the fish the tighter the engagement of the device therewith. It is also apparent that both forms of the invention can be made inexpensively from simple metal stampings.

Although only two forms of the invention have been shown and described, it is obvious that various changes and modifications may be made without departing from the spirit of the invention and all of such changes are contemplated as may come within the scope of the claims.

What we claim is:

1. A fish holding device comprising a base having an upright extension, a supporting shelf for the end of a fish connected to said upright extension, and a holding member pivotally mounted in spaced position from said shelf and swingable to clamp the fish between said holding member and shelf, said holding member having its lower edge formed with teeth bent at different angles, the point of engagement of the holding member with the fish being rearwardly of the pivotal mounting for said member whereby a pull on the fish will increase the holding engagement.

2. A fish holding device comprising an L-shaped stamping one part of which forms a base and the other part of which forms an extension bent upwardly from the rear edge of said base, a supporting member formed from a metal strip bent to U-shape to provide a rear wall and spaced parallel portions projecting from said rear wall, one of said portions forming a substantially flat supporting shelf for the end of a fish, means for swivelingly connecting the rear wall of said supporting member to the upward extension of the base, and a flap member pivoted to that projecting portion of the U-shaped supporting member which is spaced from the shelf forming portion, the axis of said pivot being substantially parallel to said shelf and said flap having a toothed portion swingable to clamp the fish between said toothed portion and the shelf, the point of said clamping engagement being rearwardly of the pivot for the flap whereby a pull on the fish will increase the holding engagement.

ALBERT R. CURTIS.
JOHN STECHAUNER.